(12) United States Patent
Baldoni et al.

(10) Patent No.: US 6,315,136 B1
(45) Date of Patent: Nov. 13, 2001

(54) STORAGE BIN SHELVING SYSTEM

(76) Inventors: Albert L. Baldoni, 248 #1B, Blakely, PA (US) 18447; Bernard S. Zipay, 402 Pierce Ave., Archbald, PA (US) 18403

( * ) Notice: Subject to any disclaimer, the term of this patent is extended or adjusted under 35 U.S.C. 154(b) by 0 days.

(21) Appl. No.: 09/430,068

(22) Filed: Oct. 29, 1999

Related U.S. Application Data

(60) Provisional application No. 60/106,601, filed on Nov. 2, 1998.

(51) Int. Cl.[7] .................................................. A47B 43/00
(52) U.S. Cl. .................................................. 211/189
(58) Field of Search .................................. 211/189, 182, 211/183

(56) References Cited

U.S. PATENT DOCUMENTS

| | | | |
|---|---|---|---|
| 1,460,928 | * 7/1923 | Tilden | 211/182 |
| 1,464,904 | * 8/1923 | Feldman | 211/182 |
| 1,484,856 | * 2/1924 | Zilisch | 211/189 |
| 1,516,281 | * 11/1924 | Eisner | 211/182 |
| 1,587,090 | * 6/1926 | Tweed | 211/182 |
| 1,747,026 | 2/1930 | Phillips . | |
| 2,533,324 | * 12/1950 | Mendle | 211/189 |
| 3,071,399 | 1/1963 | Cronin . | |
| 3,468,430 | 9/1969 | Lawman . | |
| 3,834,549 | * 9/1974 | Burg et al. | 211/189 |
| 4,776,719 | 10/1988 | Kreider . | |
| 5,695,081 | 12/1997 | Alkaly . | |
| 5,743,412 | 4/1998 | Noble . | |
| 5,964,361 | 10/1999 | Mefford . | |
| 6,044,990 | * 4/2000 | Palmeri | 211/189 |
| 6,116,437 | * 9/2000 | Rowe | 211/189 |

FOREIGN PATENT DOCUMENTS 1025347   8/1964   (GB) .

* cited by examiner

*Primary Examiner*—Alvin Chin-Shue
*Assistant Examiner*—Sarah Purol
(74) *Attorney, Agent, or Firm*—Eric N. Mahler, Esquire

(57) ABSTRACT

A knockdown storage bin shelving system having horizontal crossbars joined to vertical posts to provide a spacial interstices that form shelves for storage bins. The front and back horizontal crossbars are connected by slide rails and the horizontal crossbars and slide rails form load bearing shelves on which the storage bins are stored. The horizontal crossbars are placed at a height providing an opening in which storage bins are placed. The horizontal crossbars are placed through holes in the interior vertical posts and are connected to the outer vertical posts. The vertical posts have the largest diameter, the horizontal crossbars are smaller in diameter than the vertical posts, and the slide rails are smaller in diameter than the horizontal crossbars. The slide rails are rigidly connected to the horizontal crossbars. The horizontal crossbars are placed through holes in the interior posts until they are stopped by a dimple. The dimple insures precise placement of the interior post. The horizontal crossbar is rigidly connected to the outer and inner vertical posts. The back outer vertical posts have a mounting hole, and a mounting rail is placed in the mounting hole and connected to a mounting bracket. The mounting rail is smaller in diameter than the vertical post. The mounting bracket is connected to a support such as a wall or any other support structure.

20 Claims, 5 Drawing Sheets

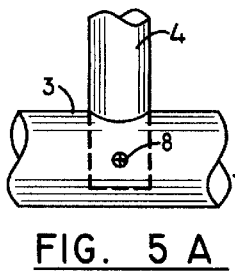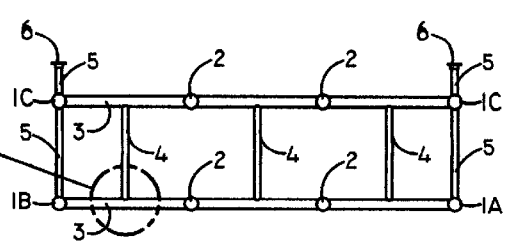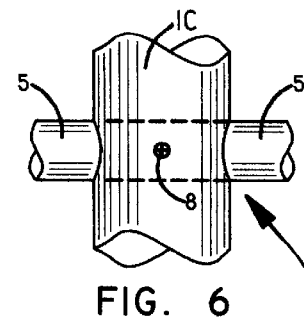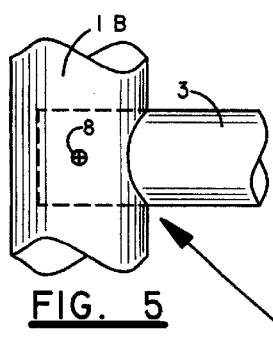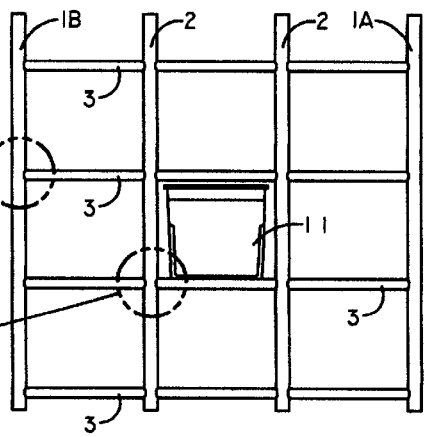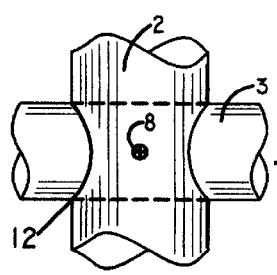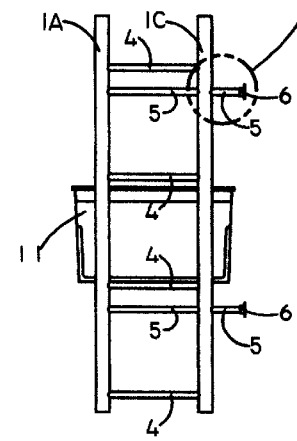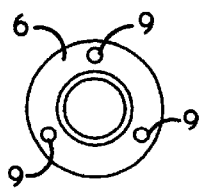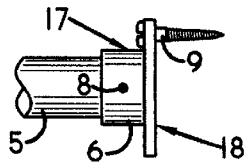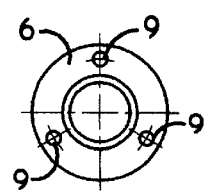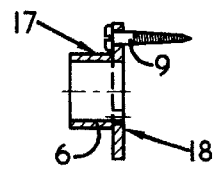

STORAGE BIN SHELVING SYSTEM

CROSS-REFERENCE TO RELATED APPLICATIONS

This Application claims the benefit of U.S. Provisional Application No. 60/106,601 filed Nov. 2, 1998.

STATEMENT REGARDING FEDERALLY SPONSORED RESEARCH OR DEVELOPMENT

Not Applicable

REFERENCE TO A "MICROFICHE APPENDIX"

Not Applicable

BACKGROUND OF INVENTION

1. Field of Invention

The present invention relates to the field of knockdown structural shelving systems, and more particularly to shelving systems utilizing interconnecting members which can be formed into a self leveling shelving system for storing a plurality of storage bins.

2. Description of Related Art Including Information Disclosed Under 37 C.F.R. 1.97 & 1.98

Structural shelving systems and specifically tubular member systems have been known for use in various applications. The manner in which members have been joined and the shelving systems have been the subject of several patents of which I am aware. Typically, the shelving systems have different connectors, assembly line type uses and work station uses. The shelving systems usually have common elements of vertical posts, horizontal beams, an interior shelf or load bearing beams, and in modular or knockdown shelving the systems can be easily assembled and disassembled.

The Cronin patent, U.S. Pat. No. 3,071,299 discloses a joint for tubular members wherein one or more tubular members are received in apertures of another tubular member with one of the received tubular members being an expandable sleeve internally mounted such that the rotation of a screw expands the sleeve internally preventing withdrawal of the received member. Other patents describe assemblies for fastening members.

The Alkalay patent, U.S. Pat. No. 5,695,081 discloses a uniform shelving system, and the Kreider patent, U.S. Pat. No. 4,776,719 discloses a tubular structural system with specific diameters and location of apertures to create a structural support system.

The Noble patent, U.S. Pat. No. 5,743,412 discloses a modular parts supply rack composed of tubular members and an adjustable shelf system using T-connectors. The modular system uses tubular members that are all the same length, and the T-connectors allow the shelves to be adjusted.

The Mefford patent, U.S. Pat. No. 5,964,361 discloses an ergonomic storage rack for holding pallets. The rack allows for storage of pallets above and below the rack, and provides an access area for a worker to enter. The structure is a post and beam, with arcurate beams connected to the posts via a plate connector.

The United Kingdom patent to Osthoff, No. 1,025,347 and the Lawman patent, U.S. Pat. No. 3,468,430 disclose shelving systems provided with tubular members having square shaped cross-sections and which are interconnected by passing one tube through an opening of another tube. The '430 patent shows the use of a screw of bolt for fastening the tube interconnection.

The Phillips patent, U.S. Pat. No. 1,747,026 discloses a tubular shelving system designed for displaying and holding piece goods or bolts of cloth. The posts are braced to each other, and the system uses a adjustable connector.

Thus, most of the shelving systems either involve a fastener or the shelving system is codependent on fasteners. Each shelving system relies on the connectors for either rigidity or for a change in structure. Most of the prior art deals with center posts connected to each other through a connector member or shelving and a fastener.

BRIEF SUMMARY OF THE INVENTION

This invention provides an improvement for storing storage bins. The shelving system comprises (1) outer vertical posts; (2) inner vertical posts (3) horizontal crossbars; (4) slide rails; (5) mounting rails; (6) mounting brackets; (7) fasteners; (8) dimples; and (9) apertures. The horizontal crossbars are supported by the inner vertical and outer vertical posts. The horizontal crossbars are placed through apertures located on the inner vertical posts until each side is stopped by a dimple. The horizontal crossbars are supported by the outer vertical posts by being placed through apertures located on the outer vertical posts and are fastened to the outer vertical post. The horizontal crossbars are spaced in horizontal pairs between the vertical posts. The slide rails are supported by the horizontal crossbars by being placed through the apertures in the horizontal crossbars and are fastened to the horizontal crossbar. The slide rails are spaced in horizontal pairs between the horizontal crossbars. The horizontal crossbars and the slide rails form a shelves. The horizontal crossbars are smaller in diameter than the vertical posts, allowing the horizontal crossbars to slide through the apertures in the inner vertical posts and for the outer vertical posts to slidably receive the horizontal crossbars in the apertures located on the outer vertical posts. The slide rails are smaller in diameter than the horizontal crossbars, allowing the horizontal crossbars to slidably receive the slide rails in the apertures located on the horizontal crossbars. The shelving system is self leveled because the slide rails are not attached to the inner vertical posts.

Preferably, the slide rails are positioned at a midpoint of each horizontal crossbar located between each vertical post. The apertures located on the vertical posts are preferably positioned so that the vertical spacing between each pair of horizontal crossbars provides an adequate height within which to place a common plastic storage bin. Each pair of vertical posts are preferably positioned so that the horizontal spacing between each pair of vertical posts provides an adequate width within which to place a common plastic storage bin.

The mounting rails are supported by being placed in the apertures of the back vertical posts and are attached to the back vertical posts using a fastener. The mounting bracket is attached to a support mechanism or wall. The mounting rails are placed in the mounting bracket and are attached to the mounting bracket using a fastener. Preferably all of the fasteners are screws, and when fastening an outer member to an inner member, the screw is fastened perpendicular to the inner member.

The shelving system is designed to provide efficient shelving space to hold a plurality of common sized storage bins. The slide rails connecting the horizontal crossbars are structurally designed to hold storage bins in an ergonomic and efficient manner. The lack of a center connector to the inner vertical posts allows an open framework, and the shelving system is self leveling. The present invention not only self levels, but uses a wall mounting bracket to provide additional support once the shelving system has self leveled. The use of the shelving system specifically for storage bins allows for an efficient shelving system that takes up a minimum of space.

According to the present invention, the use of slide rails provides an aesthetically pleasing open framework, and reduces the friction between the storage bin and the shelving system. Thus, the storage bins may be fully loaded but can be easily removed from the shelving system due to the reduced resistance. Furthermore, the dimples located on the horizontal crossbar make the attachment of the shelving system simple, by providing a frame of reference to place the vertical posts.

In a preferred embodiment of the invention, the shelving spaces are only slightly larger in height and width than the storage bins. Furthermore, the knockdown shelving unit may be bundled in a small package for sale, due to the smaller diameter of horizontal crossbars which fit inside the horizontal crossbars. Also, the use of a single slide rail creates a simple and lightweight shelving system.

Preferably, the structure of this invention is comprised of eight vertical posts arranged in pairs with four to the front and four in the back. The outer pair of vertical posts are connected to a horizontal crossbar, and the inner pair of vertical posts have the horizontal crossbars placed through an aperture in the post. There are eight horizontal crossbars arranged in pairs with four to the front and four to the back. Each pair of horizontal crossbars are interconnected with a slide rail located at the midpoint on the horizontal crossbar between each vertical post. The slide rails are the support and connecting mechanism for the shelving system. The preferred embodiment uses plastic tubular members, as the members are lightweight and stronger than most wire or wood shelving. The plastic members are also easier for use in constructing the shelving system, and are able to hold heavy loads. There are mounting brackets and mounting rails, that provide stability to the shelving unit while loading and unloading the storage bins.

BRIEF DESCRIPTION OF THE SEVERAL VIEWS OF THE DRAWINGS

FIG. 1 is a front view of the shelving unit.

FIG. 2 is a side view of the shelving unit shown in FIG. 1.

FIG. 3 is a top view of the shelving unit shown in FIG. 1.

FIG. 4 is a sectional front view of a horizontal beam passing through and fastened to an inner vertical post shown in FIG. 1.

FIG. 5 is a sectional front view of an outer vertical post interconnected with a horizontal crossbar shown in FIG. 1.

FIG. 5A is a sectional top view of a horizontal crossbar interconnected with a slide rail shown in FIG. 3.

FIG. 6 is a sectional side view of a back vertical post interconnected with a mounting rail shown in FIG. 2.

FIG. 7 is a front view of a mounting bracket shown in FIG. 2.

FIG. 7A is a sectional front view of a mounting bracket with holes for three screws shown in FIG. 2.

FIG. 8 is a side view of a mounting rail interconnected with a mounting bracket shown in FIG. 7.

FIG. 8A is a sectional side view of a mounting bracket with three screws shown in FIG. 2.

FIG. 13A is a rear view of an inner vertical post shown in FIG. 1.

FIG. 14A is a top view of a horizontal crossbar shown in FIG. 1.

FIG. 15A is a side view of a mounting rail shown in FIG. 2.

FIG. 16A is a side view of a mounting bracket with fastener holes shown in FIG. 2.

DETAILED DESCRIPTION OF THE INVENTION

Figure 9:
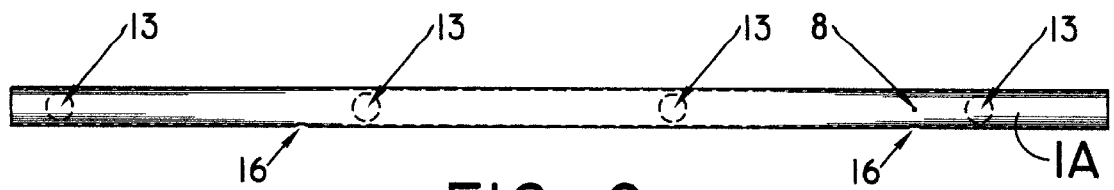
FIG. 9 is a sectional side view of an back left outer vertical post shown in FIG. 2.
Figure 9A:
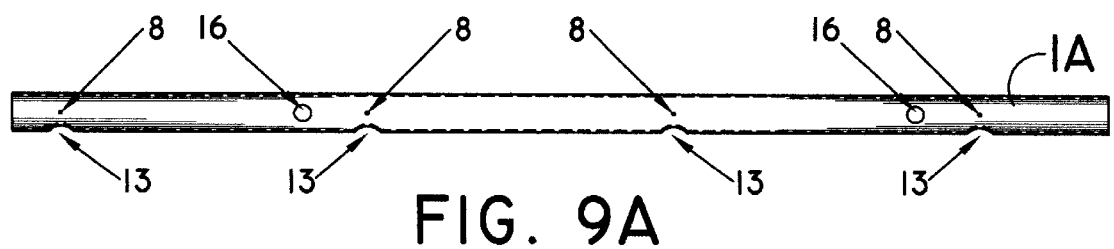
FIG. 9A is a sectional rear view of a back left outer vertical post shown in FIG. 3.
Figure 10:
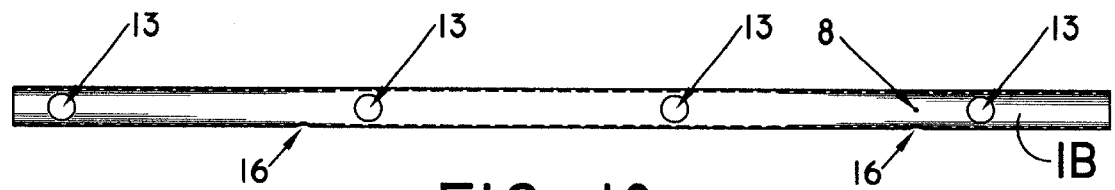
FIG. 10 is a sectional side view of a front left outer vertical post shown in FIG. 2.
Figure 10A:
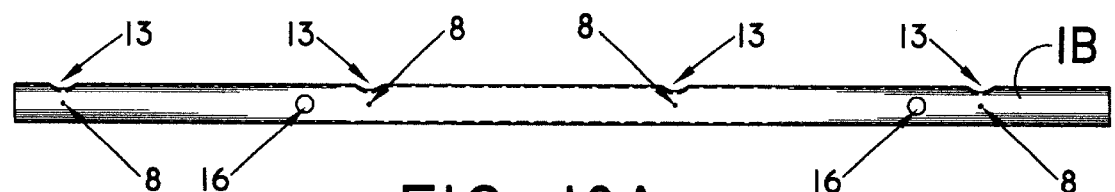
FIG. 10A is a sectional front view of a front left outer vertical post shown in FIG. 3.
Figure 11:
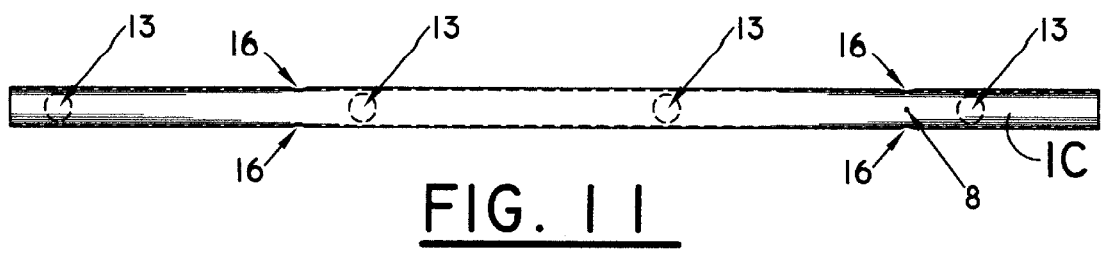
FIG. 11 is a sectional side view of a front right outer vertical post shown in FIG. 1.
Figure 11A:
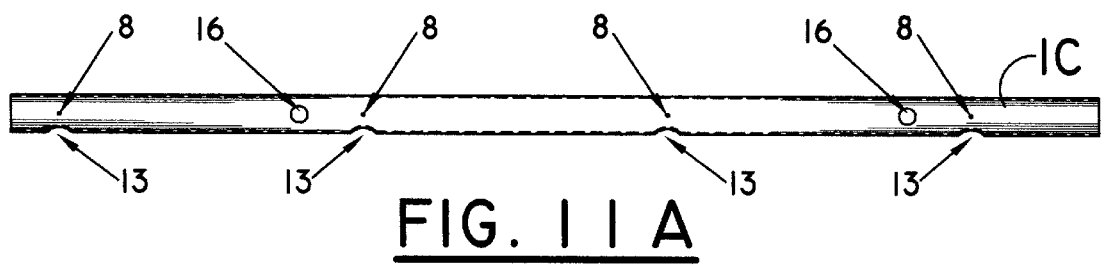
FIG. 11A is a sectional front view of a front right outer vertical post shown in FIG. 3.
Figure 12:
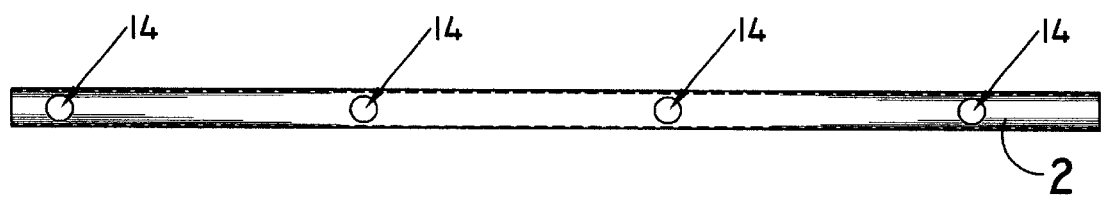
FIG. 12 is a sectional side view of a back right outer vertical post shown in FIG. 3.
Figure 12A:
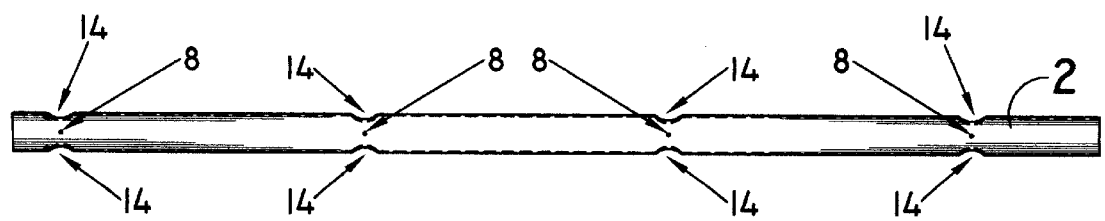
FIG. 12A is a sectional rear view of a back right outer vertical post shown in FIG. 3.
Figure 13:
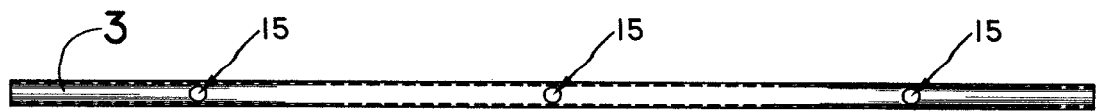
FIG. 13 is a sectional side view of the inner vertical post shown in FIG. 1.
Figure 13:
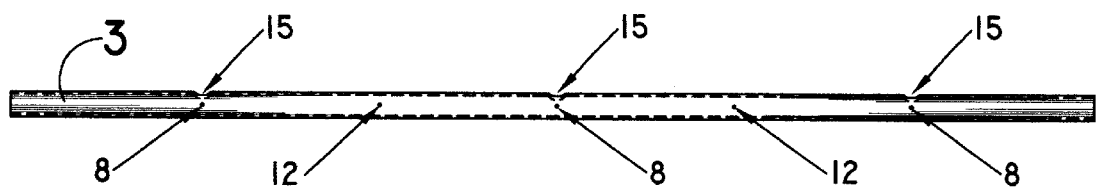
Figure 14:
FIG. 14 is a front view of a horizontal crossbar shown in FIG. 1.
Figure 15:
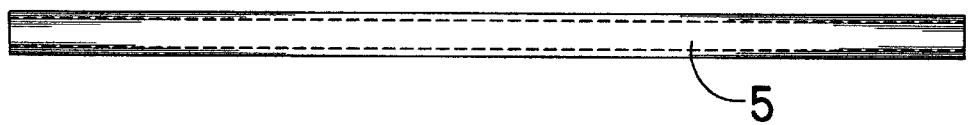
FIG. 15 is a side view of a slide rail shown in FIG. 1.
Figure 16:
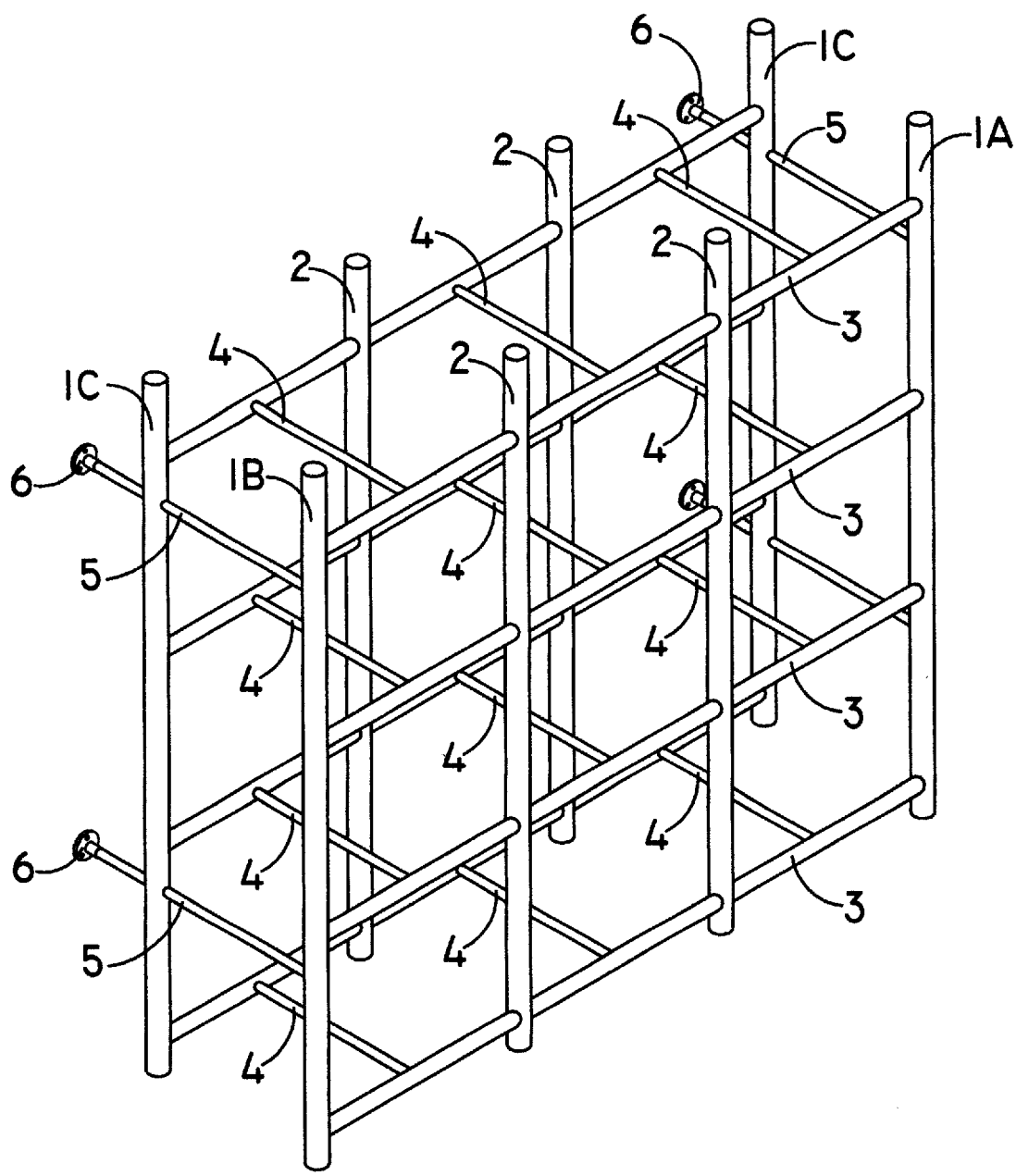
FIG. 16 is a front view of a mounting bracket with fastener holes shown in FIG. 2.

Referring now more particularly to the drawings, the shelving system of this invention is illustrated generally in FIG. 1 and FIG. 2, and where it is shown to consist essentially of outer vertical posts 1, inner vertical posts 2, horizontal crossbars 3, slide rails 4, mounting rails 5, mounting brackets 6, caps 7, fasteners 8, 9, and 10, storage bins 11, dimples 12, and apertures 13, 14, 15 and 16. A pair of outer vertical posts 1 and inner vertical posts 2, are joined together by horizontal crossbars 3. The horizontal crossbars are slidably received in outer vertical posts 1 through aperture 13 as shown in FIG. 9, and are fastened to the outer vertical posts with fastener 12 as shown in FIG. 15. The horizontal crossbars 3 are slidably received through the inner vertical posts 2 through aperture 14 as shown in FIG. 13, and may either be fastened to the inner posts 2 using fastener 13 as shown in FIG. 4 or are positioned by the dimples 12 shown in FIG. 4. The slide rails 4 are slidably received in the horizontal crossbars 3 through aperture 15 as shown in FIG. 14, and are fastened to the horizontal crossbars 3 with fastener 11 as shown in FIG. 15A. The mounting rail 5 is slidably received in the back outer vertical post 1 as shown in FIG. 6. The back outer vertical post 1 is connected to the mounting rail 5 using fastener 8 as shown in FIG. 2 and FIG. 6. The mounting rail 5 is slidably received in the sleeve connector 17 of the mounting bracket 6 and is connected to the sleeve connector 17 with a fastener 10 as shown in FIG. 8. The mounting bracket 6 is connected to a support structure or wall by attaching a mounting base 18 to the support structure using a fastener 9 or fasteners 9 as shown in FIG. 8 and 8a.

What is claimed is:

1. A knockdown storage bin shelving system comprising:

laterally spaced outer vertical posts;

said outer vertical posts having a first plurality of apertures located vertically on the inner side of said outer vertical posts;

said first plurality of apertures are smaller in diameter than the diameter of the outer vertical posts;

said laterally spaced outer vertical posts comprising of a pair of front outer vertical posts and a pair of back outer vertical posts;

said back outer vertical posts having a first mounting aperture located vertically on the back of said back outer vertical post;

said first mounting aperture smaller in diameter than the diameter of the back outer vertical post;

laterally spaced inner vertical posts;

said inner vertical posts having a second plurality of apertures positioned vertically on the inner and outer side of the inner vertical posts;

said second plurality of apertures are adjacent and correspondingly positioned to said second plurality of apertures on each inner vertical post;

said second plurality of apertures are adjacent and correspondingly positioned to said first plurality of apertures on each outer vertical post;

said second plurality of apertures are smaller in diameter than the diameter of the inner vertical posts;

laterally spaced horizontal crossbars;

said horizontal crossbars are smaller in diameter than the diameter of the inner and outer vertical posts;

said horizontal crossbars are smaller in diameter than the first and second plurality of apertures;

said horizontal crossbars having a third plurality of apertures positioned horizontally on the inner side of the horizontal crossbars;

said third plurality of apertures are smaller in diameter than the diameter of the horizontal crossbars;

said third plurality of apertures are positioned adjacent to correspondingly positioned apertures on each horizontal crossbar;

side rails;

said side rails are smaller in diameter than the diameter of the horizontal crossbars;

said side rails are smaller in diameter than the diameter of the third plurality of apertures;

said horizontal crossbars are slidably received through said second plurality of apertures;

the horizontal crossbars are perpendicular to the inner vertical posts;

the opposite ends of the horizontal crossbars are slidably received in said first plurality of apertures;

said horizontal crossbars are perpendicular to the outer vertical posts;

first fastening means capable of connecting the opposite ends of the horizontal crossbars to the outer vertical posts;

said slide rails are slidably received in said third plurality of apertures;

said slide rails are perpendicular to the horizontal crossbars;

second fastening means capable of connecting the horizontal crossbars to the inner vertical posts;

third fastening means capable of connecting the opposite ends of the slide rails to the horizontal crossbars;

mounting rails;

said mounting rails are smaller in diameter than the outer vertical posts;

said mounting rails are smaller in diameter than the first mounting aperture;

the mounting rails are slidably received in the first mounting apertures;

said mounting rails are perpendicular to the outer vertical posts;

fourth fastening means capable of connecting an end of the mounting rail to the back outer vertical posts;

a pair of mounting brackets;

said mounting brackets each comprising a sleeve connector and a mounting base;

said sleeve connector larger in diameter than the diameter of said mounting rail;

the mounting rails are slidably received in the sleeve connectors;

said mounting rails are parallel to the sleeve connectors;

said mounting rails are perpendicular to the mounting bases;

fifth fastening means capable of connecting an end of the mounting rail to the sleeve connector; and sixth fastening means capable of connecting the mounting bracket to a support structure.

2. A shelving system as defined in claim 1, wherein the slide rails are positioned laterally along the horizontal crossbars at a midpoint between each vertical post.

3. A shelving system as defined in claim 2, comprising dimples being positioned horizontally on the bottom of the horizontal beam for slidably stopping the inner vertical posts at correspondingly lateral positions on the front and back inner vertical posts; or dimples being positioned horizontally on the top of the horizontal crossbar for slidably stopping the inner vertical posts at correspondingly lateral positions of the front and back inner vertical posts.

4. A shelving system as defined in claim 3, wherein said first fastening means, said second fastening means, said third fastening mean, said fourth fastening means and said fifth fastening means each comprising screws.

5. A shelving system as defined in claim 4, wherein said first fastening means being positioned at the outer side of the outer vertical posts, at the horizontal midpoint of the diameter of the outer vertical posts, and at the vertical midpoint of the first plurality of apertures, being perpendicular to said horizontal crossbars;

said second fastening means being positioned at the front of the inner vertical posts, at the horizontal midpoint of the diameter of the inner vertical posts and at the vertical midpoint of the second plurality of apertures, being perpendicular to said horizontal crossbars.

said third fastening means being positioned at the bottom of the horizontal crossbar, at the midpoint of the horizontal diameter of the horizontal crossbars, and at the horizontal midpoint of the third plurality of apertures and being perpendicular to said slide rails; and said fourth fastening means being positioned at the outer of the midpoint of the diameter of the back outer vertical post and being positioned at the longitudinal midpoint of the mounting apertures;

said fifth fastening means being positioned at the midpoint of the sleeve connector and perpendicular to the mounting rail; and said sixth fastening means being triangularly positioned around the mounting base.

6. A shelving system as defined in claim 5, wherein said fifth fastening means being positioned at the midpoint of the mounting base.

7. A shelving system as defined in 5, wherein each of said inner and outer vertical posts, said horizontal crossbars, said slide rails, and said mounting rails each comprising tubular structures.

8. A shelving system as defined in claim 7 wherein said tubular structures are hollow.

9. A shelving system as defined in claim 8, wherein said tubular structures are comprised of metal alloys.

10. A shelving system as defined in claim 8 wherein said tubular structures are comprised of plastics.

11. A shelving system as defined in claim 10 wherein:

said vertical posts having an outside diameter between 2.25 and 2.50 inches;

said horizontal crossbars having an outside diameter between 1.50 and 1.75 inches;

said slide rails having an outside diameter between 1 and 1.25 inches;

said mounting rail having an outside diameter between 1 and 1.25 inches;

said first plurality of apertures having a diameter between 1.50 and 1.75 inches;

said second plurality of apertures having a diameter between 1.50 and 1.75 inches;

said third plurality of apertures having a diameter between 1.0 and 1.25 inches;

said mounting aperture having a diameter between 1.0 and 1.25 inches;

said sleeve connector having an inside diameter between 1.0 and 1.25 inches and an outside diameter between 1.25 and 1.50 inches;

said sleeve connector having a width between 0.65 and 0.85 inches;

said mounting base having an outside diameter between 2.25 and 2.50 inches; and said mounting base having a width between 0.1 and 0.25 inches.

12. A shelving system as defined in claim 10 wherein:

the first plurality of apertures are circular;

the second plurality of apertures are circular;

the third plurality of apertures are circular;

the mounting apertures are circular; and the sleeve connector is circular.

13. A shelving system as defined in claim 10 wherein:

the first plurality of apertures are elliptical;

the second plurality of apertures are elliptical;

the third plurality of apertures are elliptical;

the mounting apertures are elliptical; and the sleeve connector is elliptical.

14. A shelving system as defined in claim 10 wherein:

said first plurality of apertures consist of four apertures for each outer vertical post;

said second plurality of apertures consists of four apertures for each inner vertical post; and said third plurality of apertures consists of three apertures for each horizontal crossbar.

15. A shelving system as defined in claim 10 wherein:

the midpoint of the first plurality of apertures are located at 3.0 inches from the bottom of the outer vertical post, 22.0 inches from the bottom of the outer vertical post, 41.0 inches from the bottom of the outer vertical post, and 60.0 inches from the bottom of the outer vertical post;

the midpoint of the second plurality of apertures are located 3.0 inches from the bottom of the inner vertical post, 22.0 inches from the bottom of the inner vertical post, 41.0 inches from the bottom of the inner vertical post, and 60.0 inches from the bottom of the inner vertical post;

the midpoint of the third plurality of apertures are located latitudinally on the horizontal beam with a first horizontal aperture located 11.75 inches from the end of the horizontal beam, a second horizontal aperture located 34.0 inches from the end of the horizontal beam, and a third horizontal aperture located 45.75 inches from the end of the horizontal beam; and the midpoint of the mounting aperture is located 56.0 inches from the bottom of the outer vertical post.

16. A shelving system as defined in claim 10 comprising:

four outer vertical posts;

four inner vertical posts;

eight horizontal crossbars;

twelve slide rails;

two mounting rails;

two mounting brackets;

said first fastening means consisting of 8 screws;

said second fastening means consisting of 16 screws;

said third fastening means consisting of 24 screws;

said fourth fastening means consisting of 2 screws;

said fifth fastening means consisting of 2 screws; and said sixth fastening means consisting of 3 screws.

17. A shelving system as defined in claim 5 comprising:

four outer vertical posts;

four inner vertical posts;

eight horizontal crossbars;

twelve slide rails;

two mounting rails;

two mounting brackets;

said first fastening means consisting of 8 screws;

said second fastening means consisting of 16 screws;

said third fastening means consisting of 24 screws;

said fourth fastening means consisting of 2 screws;

said fifth fastening means consisting of 2 screws; and said sixth fastening means consisting of 3 screw.

18. A shelving system as defined in claim 10 wherein said first, second, third, and fourth fastening means consists of #8 ¾ inch screws;

said fifth fastening means consists of #12 1¼ inch screws; and said sixth fastening means consists of #8 1½ inch screws.

19. A shelving system as defined in claim 1 comprising two or more shelving units.

20. A system as defined in claim 19 wherein a first shelving unit is positioned perpendicularly to a second shelving unit, said system further comprising a sixth plurality of apertures.

* * * * *